(12) United States Patent  
Norcott, Jr. et al.

(10) Patent No.: US 6,535,588 B1
(45) Date of Patent: Mar. 18, 2003

(54) TELEPHONE ACCESSORY COMMUNICATIONS DEVICE

(75) Inventors: Alfred A. Norcott, Jr., Vienna, VA (US); Stephen C. Stallings, Alexandria, VA (US)

(73) Assignee: SVI Systems, Inc., Peoria, IL (US)

( * ) Notice: Subject to any disclaimer, the term of this patent is extended or adjusted under 35 U.S.C. 154(b) by 0 days.

(21) Appl. No.: 08/429,954

(22) Filed: Apr. 27, 1995

(51) Int. Cl.[7] .............................................. H04M 11/00
(52) U.S. Cl. ................... 379/91.01; 379/93.12
(58) Field of Search ........................... 379/90, 91, 92, 379/144, 442, 443, 447, 357, 91.01, 91.02, 93.02, 93.12, 90.01; 348/3, 7, 8, 10, 6; 235/379, 380, 381

(56) References Cited

U.S. PATENT DOCUMENTS

| | | | |
|---|---|---|---|
| 3,564,211 A | 2/1971 | Angus ..................... 235/61.11 |
| 3,571,799 A | 3/1971 | Coker et al. ................ 340/152 |
| 3,736,368 A | 5/1973 | Vogelman et al. ........... 178/5.1 |
| 3,800,283 A | 3/1974 | Gropper ..................... 340/149 |
| 3,890,461 A | 6/1975 | Vogelman et al. ........... 178/5.1 |
| 3,940,796 A | 2/1976 | Haun et al. ................. 360/109 |
| 3,962,726 A | 6/1976 | DeLand, Jr. ................ 360/51 |
| 4,057,829 A | 11/1977 | Moorehead .................. 358/86 |
| 4,247,759 A | 1/1981 | Yuris et al. ................. 235/381 |
| 4,360,828 A | 11/1982 | Briggs, Jr. et al. ............ 358/86 |
| 4,829,560 A | 5/1989 | Evanyk et al. ............... 379/106 |
| 4,845,740 A | 7/1989 | Tokuyama et al. ............ 379/91 |
| 4,897,865 A * | 1/1990 | Canuel |
| 4,947,244 A | 8/1990 | Fenwick et al. ............... 358/86 |
| 4,949,192 A | 8/1990 | McGeary ....................... 360/2 |
| 5,010,240 A | 4/1991 | Sheldon ....................... 235/382 |
| 5,091,807 A | 2/1992 | Baus, Jr. et al. .............. 360/71 |
| 5,091,961 A | 2/1992 | Baus, Jr. ....................... 382/7 |
| 5,101,097 A | 3/1992 | Conant ....................... 235/449 |
| 5,128,983 A * | 7/1992 | Tanaka ........................ 379/91 |
| 5,164,576 A | 11/1992 | Anglin et al. ............... 235/483 |
| 5,204,513 A | 4/1993 | Steele ......................... 235/449 |
| 5,256,867 A | 10/1993 | Chen .......................... 235/484 |
| RE34,611 E | 5/1994 | Fenwick et al. ............... 348/7 |
| 5,311,302 A * | 5/1994 | Berry et al. .................. 379/90 |
| 5,323,448 A | 6/1994 | Biggs ......................... 379/91 |
| 5,343,514 A * | 8/1994 | Snyder ........................ 379/93 |
| 5,418,837 A * | 5/1995 | Johansson et al. .......... 379/357 |
| 5,475,740 A * | 12/1995 | Biggs, Jr. et al. ............. 379/91 |

OTHER PUBLICATIONS

IBM Technical Disclosure, J. Svigals, Low Cost Point of Sale Terminal, Sep. 1982, vol. 25, No. 4.*

* cited by examiner

*Primary Examiner*—Stella Woo
(74) *Attorney, Agent, or Firm*—Olson & Hierl, Ltd.

(57) ABSTRACT

A telephone accessory communications device suitable for the delivery of DTMF tones over a standard telephone line, which has a card reader, microprocessor and telephone signaling generator that produces the DTMF tones corresponding to data encoded on the strip of a card. A memory device may also be included that stores information regarding the location of the telephone accessory communications device, and one or more telephone numbers used to access desired services. A standard telephone set can be connected to the telephone accessory communications device. The device can be programmed by a computer via a cable connector or a magnetic programming card.

25 Claims, 2 Drawing Sheets

TELEPHONE ACCESSORY COMMUNICATIONS DEVICE

FIELD OF THE INVENTION

This invention pertains to a device for delivery of stored information. More particularly, the invention pertains to a card reader for delivering stored information over telephone lines using DTMF signals.

BACKGROUND OF THE INVENTION

As credit card use proliferates, many services now utilize point-of-sales systems that allow a user to receive the service by simply passing a credit card through the system. Such a system is illustrated in U.S. Pat. No. 4,247,759 to Yuris et al. entitled "SELF-SERVICE PASSENGER TICKETING SYSTEM." The disclosed system is a single unit electro-mechanical ticket terminal having a card reader, a modem, destination select buttons and a printer. When the user passes a credit card through the card reader, information stored on the card is passed by the modem from the ticket terminal to an external central computer.

The central computer determines the credit associated with that credit card, and enables the ticket terminal if the credit is acceptable. Once enabled, the user selects a destination by using the destination select buttons. The ticket terminal prints a ticket corresponding to the selected destination, without the need for a ticket agent.

The general idea of such a system may be used by other industries to provide additional benefits. In the lodging industry, for example, many room entertainment systems presently in operation typically include user controlled hardware that is either a type of set-top converter box or custom television set which enables the user to purchase a movie. Set-top converter boxes and custom television sets are relatively expensive, however, require two-way capabilities of the hotel's cable system, and can create user confusion. This confusion frequently causes unintended activation of a service and the user being billed the corresponding charges since the billing is usually done automatically without the user having an opportunity to deny the service.

Moreover, these set-top converter boxes and custom television sets normally require a custom remote control to operate them, thereby adding more expense. Thus, to convert a hotel room to provide movies, much hardware will have to be added. In other words, these systems will not simply be added to the existing hotel cable system without considerable expense to upgrade the cable system. Another disadvantage of the above-described set-top converter boxes and custom television sets is that they are costly to manage.

U.S. Pat. No. 5,323,448 to Biggs entitled "SYSTEM FOR ACCESSING AMENITIES THROUGH A PUBLIC TELEPHONE NETWORK" discloses an accessing system that has a telephone set with additional keys, a card reader, a CPU, memory, and a device operable to generate DTMF signals. All these components are contained in one unit.

The system of U.S. Pat. No. 5,323,448 operates by the user first swiping a credit card through the card reader. A display will indicate whether the card is valid. If so, one of the services is selected and the system connects the user to that service.

Although the systems disclosed in U.S. Pat. Nos. 4,247,759 and 5,323,448 provide credit card actuated point-of-sales systems, several disadvantages exist. First, these disclosed systems are neither easily adaptable for use nor feasible with existing hotel cable systems. Further, these systems provide components that are unnecessary to the needs of the hotel movie system, such as the modem and printer of U.S. Pat. No. 4,247,759 or the telephone of U.S Pat. No. 5,323,448 that most hotel rooms already offer.

Another disadvantage of the above-discussed systems is that they are enabled by an initial credit card swipe. This is important when considering problems that may occur during the activation procedure for the service. For example, in either system disclosed in the above-mentioned patents, the telephone service may be disrupted or a system equipment failure may abort or corrupt a service activation process. A consequence may arise where the user's credit card number will be improperly charged for the service that was never provided. Not only will this cause user anxiety and lack of confidence in the system, but will also incur costs to correct. Thus, providing the user's credit card number first to enable these discussed systems unacceptably increases the probability of the user being improperly charged.

Accordingly, there continues to be a need to provide a cost effective card reader for delivering magnetically or electrically stored information over telephone lines to an external apparatus using dual tone multi frequency (DTMF) signals, and that is easily added to and adaptable for use with many different hotel cable system equipment presently in use.

SUMMARY OF THE INVENTION

A telephone accessory communications device, particularly well suited for use with a hotel video entertainment system, includes an information retrieving device, such as a magnetic card reader, which provides an information signal corresponding to data stored by an information storage device, such as a credit card, and an actuator device having at least one actuator, for instance a depressible service selector key, that provides a service select signal corresponding to a service chosen by a user. A central processing unit, such as a microprocessor, is electrically coupled to receive the information and the service select signals. The microprocessor generates a first control signal corresponding and responsive to the receipt of the service select signal and a second control signal corresponding and responsive to the receipt of the information signal. A third control signal corresponding to an identification number can also be generated by the microprocessor in response to receipt of that number.

A telephone signalling generator is further included in the telephone accessory communications device and is coupled to receive the first, second and third control signals to generate and provide corresponding first, second and third analog signals, such as DTMF signals. Preferably, the microprocessor generates the third control signal after the transmission of the first DTMF signal corresponding to the first control signal. Subsequently, the microprocessor preferably generates the second control signal.

The DTMF signals are received by an external apparatus, such as a control system that includes a service computer, which is operated by the service provider. The service computer uses the information transmitted by the DTMF tones to select a requested service, identify the user location and to bill the user for that service. To illustrate, if the selected service is a movie, then the service computer enables the hotel entertainment system to provide the movie to the television set in the room of the identified user. The service computer is subsequently accessed by the vendor of the movie service to obtain the billing information.

The telephone accessory communications device can be electrically connected in series with an analog response device, exemplified below as a standard telephone set having a keypad, to a telephone line. Or, it may be connected to a DTMF keypad, computer modem or other analog response device capable of communicating over a standard telephone line. DTMF signals generated by the standard telephone set pass through the telephone accessory communication device to the telephone line. Preferably, power is supplied to the inventive device from the telephone line when the telephone set is off hook. The telephone accessory communications device can use a wall mount power supply as an alternate power supply, if desired.

A memory device, such as an EEPROM, is electrically coupled to the microprocessor to provide signals that represent memory data stored therein. The memory data can be telephone numbers, access codes, an identification or a serial number, and program code. The memory data can be changed or additional data can be added after the device is installed in a hotel room to the hotel video entertainment system.

The operation of the telephone accessory communications device begins when a service selector key that corresponds to the desired service is depressed. The microprocessor retrieves information about the selected service from the memory device. The retrieved information includes any necessary telephone number and access codes to connect to the external apparatus of the service provider and an identification or a serial number that is used to identify the telephone accessory communications device. The microprocessor provides the retrieved information to the telephone signalling generator so that DTMF signals generated by the telephone signalling generator correspond to the retrieved information and are provided onto a telephone line.

After being prompted, the user accepts and receives the service by passing a credit card through the card reader. The microprocessor then relays information retrieved from the credit card by the reader to the telephone signalling generator to generate a DTMF signal that corresponds to this information. The service transaction is then completed, and the user receives the service.

The telephone accessory communication device can be programmed, either prior to or after installation, by a credit card-type device or by means of a cable link to a computer or the like. To program the memory, the credit card-type device is passed through the card reader. Alternatively, a computer cable link may be provided between the CPU and an external device, such as a computer. The programming capability provided by the telephone accessory communication device allows the memory of the inventive device to be changed or added to easily and cost effectively.

Since the device is configured to communicate unidirectionally, the number and complexity of the components are minimized so that the cost of the device and the power consumption is reduced. Further, the components are available mass produced, which facilitates low cost manufacturing and repair. Reliability is enhanced as well. The design also provides a low cost installation in a wide variety of lodging entertainment systems. The present device can also be installed in resorts, hospitals, apartment complexes or other multiple unit structures wherever a telephone line is or becomes available.

Numerous other advantages and features of the present invention will become readily apparent from the following detailed description of the invention and the embodiments thereof, from the claims and from the accompanying drawings in which details of the invention are fully and completely disclosed as a part of this specification.

DETAILED DESCRIPTION OF THE PREFERRED EMBODIMENT

Figure 1:
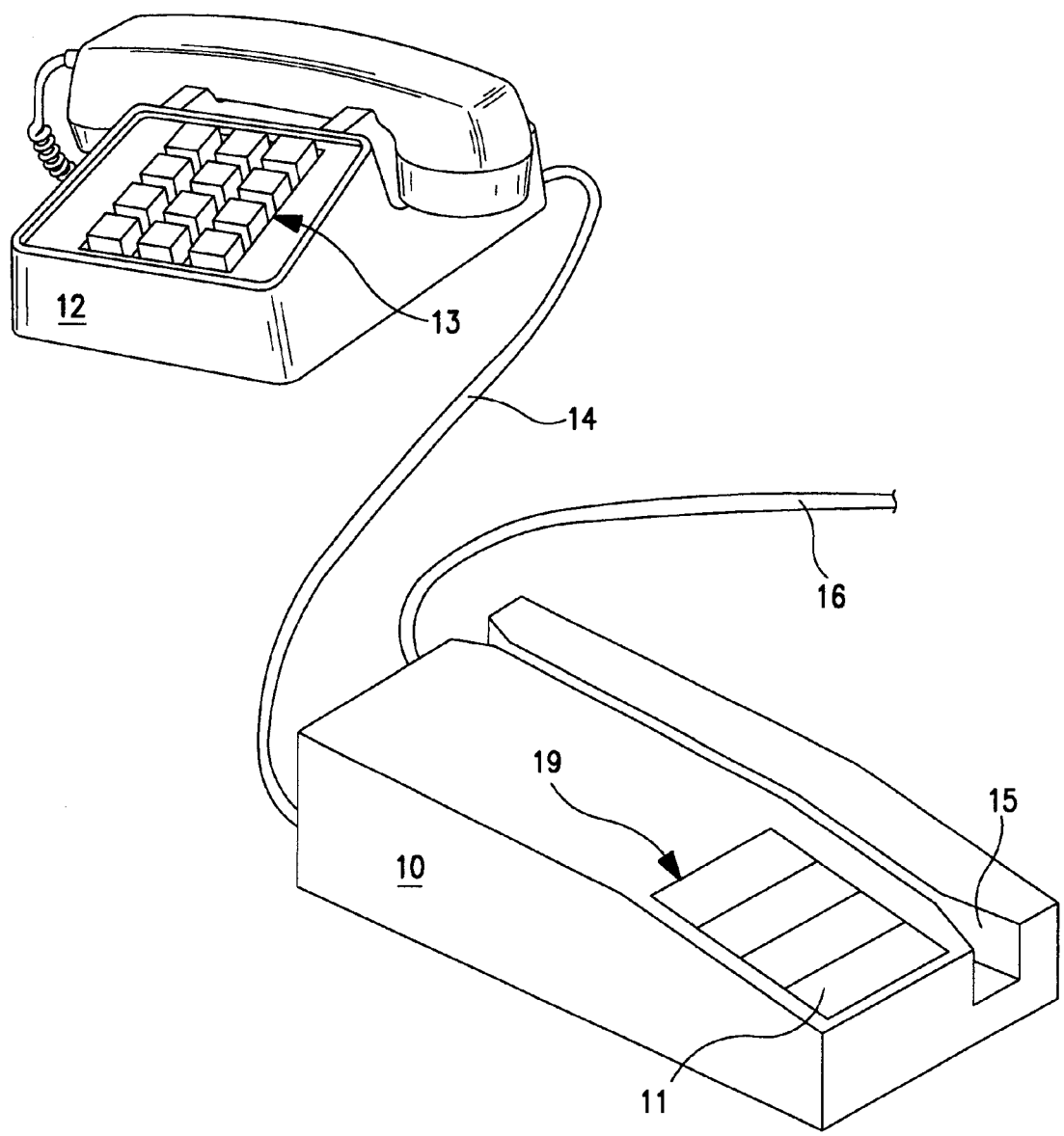
FIG. 1 is an overall perspective view of a standard telephone set connected to a telephone accessory communications device embodying the present invention.

While this invention is susceptible of embodiment in many different forms, there are shown in the drawings and will be described herein in detail a specific embodiment thereof with the understanding that the present disclosure is to be considered as an exemplification of the principles of the invention and is not to be limited to the specific embodiment illustrated.

As shown in FIG. 1, a telephone accessory communications device 10 embodying the present invention includes a membrane keypad 19, having at least one service selector key 11 and a card slot 15. Telephone accessory communications device 10 is operably connected in series with a standard telephone set 12 to a standard telephone line by a cable 16. The standard telephone set 12 includes a keypad 13 and is connected to the device 10 via cable 14. Cables 14 and 16 are connected to the telephone accessory communications device 10 through telephone jacks, preferably jacks that are interchangeable such as the RJII telephone jacks.

Figure 2:
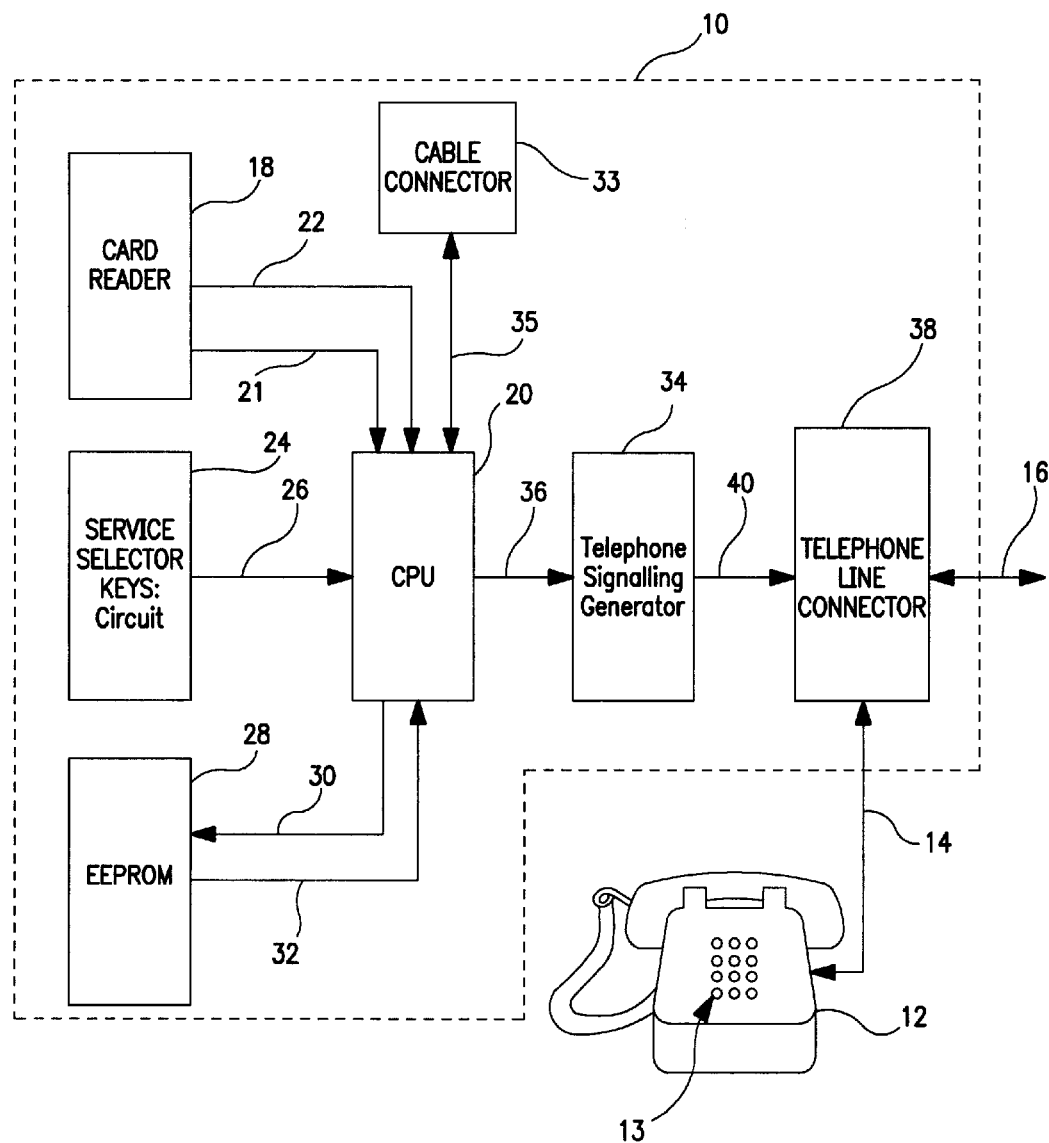
FIG. 2 is a schematic block diagram of the telephone accessory communications device shown in FIG. 1.

Illustrated in FIG. 2 is a block diagram of the telephone accessory communications device 10 that includes a magnetic card reader 18 associated with card slot 15 (shown in FIG. 1). The card reader 18 may include amplifier circuitry to amplify as output an information signal that corresponds to detected magnetically stored information. The stored information includes either a credit card number or programming data used to program device 10. Preferably, an ABA Track 2 Magnetic Card Reader assembly is used in conjunction with the card slot 15 to collect American Banking Association Track 2 information, an industry standard.

The card reader 18 is coupled to a central processing unit (CPU) 20 via leads 21 and 22. CPU 20 can be any available microprocessor or microcontroller, such as a Microchip PIC 16C84. CPU 20 receives a signal from the card reader 18 via lead 21 when a card is passed through it, and receives the information signal from the card reader 18 via lead 22. CPU 20, as well as the other circuitry of the telephone accessory communications device 10, receives power from cable 16 when telephone set 12 is off hook. CPU 20 preferably resets when power is first provided. The series connection of the card reader 18 and the telephone set 12 permits the most reliable extraction of power from the telephone line, and ensures that the device is only powered up and always reset when the telephone set is taken off hook and a circuit is established. Another external power source may be used as an alternative to the standard telephone line.

CPU 20 is also coupled to an actuator device shown as a service selector keys circuit 24 via a lead 26. Service selector keys circuit 24 preferably includes a membrane key pad 19 that includes the service selector key 11, possibly other keys, and other circuitry if required to send an output service select signal to CPU 20 to register that the service selector key 11 has been depressed. Preferably, service selector keys circuit 24 includes four membrane keys. The other circuitry is readily discernable to one skilled in the art and is therefore not further described.

CPU 20 is coupled to an EEPROM 28 by leads 30 and 32. In the preferred embodiment, the EEPROM 28 is integrated with CPU 20. The lead 30 provides input memory control and address signals from CPU 20, as well as data to be programmed into the memory. The data to be programmed includes an identification, serial or telephone number. The lead 32 provides at least one output memory signal corresponding to memory data stored in EEPROM 28 in response to the input memory control and address signals provided by CPU 20 on lead 30. The data stored in EEPROM 28 can include telephone and identification or serial numbers, access codes and program code which controls CPU 20. Thus, a respective output memory signal will be generated for each of the serial and telephone numbers. The device 10 can omit the EEPROM 28, and CPU 20 can therefore store information in its internal registers or memory, for example.

A computer cable connector 33 is connected to CPU 20 via a lead 35. A cable link to a computer or the like is removably engageable with the computer cable connector 33 to operably connect CPU 20 with the computer. After engagement, the computer can provide the programming data to CPU 20 to program EEPROM 28 preferably prior to installation of the device 10. Preferably, computer cable connector 33 is electrically connected to CPU 20 partially in parallel with card reader 18 to share at least the same data lead into CPU 20. Alternatively, a magnetic card can be used to change or store data in EEPROM 28 after the present invention is installed by swiping the card through card slot 15.

Programming the device 10 using the cable connector 33 is preferred to change or update program code, or modify the identification number, in EEPROM 28. The magnetic card programming is preferably used to install or change the telephone and access numbers. Thus, programming using the cable connector 33 is preferably utilized at the factory to setup device 10, and for subsequent program code modification. The setup can include programming the identification or serial number, and storing the program code that operates the device. The magnetic programming cards are a quick and easy means for changing basic data, such as telephone and access numbers, in device 10 while on site.

If the telephone or identification number data were corrupted, erased or never programmed, the telephone accessory communications device 10 will alert the user by enabling an audible tone to indicate an error condition, and then halt operations. The audible tone may be transmitted through the handset of standard telephone set 12 when it is off hook.

Preferably, CPU 20 is coupled to a telephone signalling generator 34 via a preferred serial lead 36. CPU 20 generates control signals that correspond to the service select signal and the memory information signals from the EEPROM 28, and the information signal from the card reader 18. The telephone signalling generator 34 provides analog signals, such as DTMF signals, that correspond to the control signals received from CPU 20. The device 10 can also be designed to transmit signals using various other standard data transmission techniques. Telephone signalling generator 34 is preferably a Signetics PCD 3312 DTMF generator.

Telephone signalling generator 34 outputs to a telephone line connector 38 via a lead 40 the generated DTMF signals to be output onto cable 16. Cable 16 is preferably connected to an external apparatus through a telephone switching system, such as a PBX, or may alternatively be connected directly to the external apparatus. The telephone line connector 38 is a preferred transistor amplifier known in the art.

The telephone accessory communication device 10 preferably is programmed with an identification or serial number before it is installed that readily identifies the source of the service request. An unprogrammed communication device can also provide audible tones that an error condition exists, such as non-existent serial number data in the EEPROM 28 when device 10 is used without having been programmed. This also provides a safeguard against the use of unauthorized devices inasmuch as input from such devices can be rejected by the external apparatus providing the service.

The device 10 can be programmed by swiping a magnetic programming card, such as a credit card-type device, through the slot 15 or by using a computer connected by a cable. Once the serial number is successfully programmed into the EEPROM 28, the device 10 preferably emits signals that the telephone set 12 provides as three audible beeps or tones.

Once installed, the device 10 can be programmed by another magnetic programming card or by using a computer that contains the information required for the offered services, such as telephone numbers. The telephone number preferably can be a maximum of 20 digits or pauses. Specifically, the EEPROM 28 is programmed with information that corresponds to each service selector key included on the device 10. However, the EEPROM 28 can be programmed so that not all the keys are usable, if desired. This expedient may be useful, for example, when a hotel offers less services than the number of service selector keys offered by the device 10.

The magnetic programming card or the computer with the cable will program the EEPROM 28 with all zeros, or any other sequence that CPU 20 will recognize as disabling a specific key. Preferably, separate magnetic programming cards are used to program each service selector key memory location.

To program the device with a computer, the computer is linked to cable connector 33 by a suitable cable. Power can be supplied to the device 10 through an interface card associated with the computer. Accordingly, this allows device 10 to be programmed without deriving power from the telephone line. The data is then supplied from the computer to CPU 20 as described below.

An alternate procedure to program the device 10 utilizes a magnetic programming card that is the only card the device 10 will respond to without having a service selector key pressed first. Thus, a programmer picks up the handset of the telephone set 12 connected to the device 10 to supply power and swipes the magnetic programming card through the card slot 15.

The data used to program EEPROM 28 includes data in a preferred positional sequence. The data at a first position corresponds to a start sentinel, which is represented by 0Bh. At the second position is a field separator represented by 0Dh. The presence of the field separator after the start sentinel alerts CPU 20 that the EEPROM 28 is to be programmed.

At the third position is data that identifies to CPU 20 whether a telephone number or a serial number is being programmed. If the serial number is being programmed, the third position data will preferably be 0Ch. If a telephone number is being programmed, then the data represents which one of the service selector keys memory locations is being programmed. For example, the data may be 01h to represent that the memory location corresponding to a first service selector key is being programmed with a telephone number.

The next multiple positions include the data for either the serial number or a telephone number. The number of multiple positions equals the number of digits (or pauses as explained below) of the serial or telephone number. For the serial number, the data is preferably no more than six digits long that can be represented by the numbers 00h–09h. However, any length can be chosen for the serial number. It is preferred that the values 0Ah–0Eh are invalid for programming the serial number since these numbers are reserved for other uses, such as control codes. Any digits beyond the first six will be ignored.

The programmed telephone number can include numbers 1–9 represented by 00h–09h. Pauses may also be included in the telephone number, which are represented by a two number sequence. The sequence consists of 0Ah, a control code, followed by a number from 00h–05h, where each sequence has a pause duration as shown in Table 1.

TABLE 1

Pause Code Sequences with Respective Durations

| Pause Code Sequence | Pause duration |
|---|---|
| 0Ah, 00h | 995.5410 ms |
| 0Ah, 01h | 1991.0820 ms |
| 0Ah, 02h | 2986.6239 ms |
| 0Ah, 03h | 4977.7050 ms |
| 0Ah, 04h | 8959.8690 ms |
| 0Ah, 05h | 14933.1150 ms |

To illustrate, many hotel telephone systems require an access code consisting of an "8" or "9" to precede a telephone number when attempting to access an outside line of the PBX. A short pause is then used after the access code so that the outside line can be connected to the device 10 via the PBX before the device 10 begins dialing the service telephone number. Alternatively, device 10 can use an inside line so that the corresponding telephone number may not require an access code and may be less than seven digits, such as four digits.

After the telephone number is dialed, another pause is used to allow device 10 to be connected to the system that controls the selected service. This pause is preferably between five to fifteen seconds. After connection, the system that controls the selected service is ready to receive the serial number from device 10.

For example, a telephone number can be 09 0A 00 01 08 00 00 04 03 05 01 02 03 04 0A 04 (all in hexadecimal). The 09 is the access code, followed by a 1 second pause (0A 00), the telephone number 18004351234 (01 08 00 00 04 03 05 01 02 03 04), and ending with a nine second pause (0A 04). After the pause, the device 10 transmits its serial number.

Since it is preferred that each telephone number not exceed twenty digits or pauses, any digit or pause beyond twenty will be ignored. When programming a service selector key to be disabled, a number can be used that is recognized by CPU 20 as disabling that service selector key so that CPU 20 can enable audible tones to the user that the service selector key is disabled.

The next position of the data sequence is the end sentinel represented by 0Fh. The last position contains longitudinal redundancy check data represented by 00h–0Fh, which is a preferred exclusive-or function of the hexadecimal equivalents of the DTMF characters in the previous positions.

CPU 20 generates appropriate input memory address and control signals in response to this programming data. These signals are received by EEPROM 28 so that the identification or telephone number contained in the programming data is stored in an appropriate location. When successfully programmed with a telephone number by the magnetic programming card or the computer, device 10 responds by enabling audible beeps or tones, preferably an ascending scale tone through the handset of telephone set 12.

The operation of the present preferred embodiment may be illustrated by referring to FIGS. 1 and 2. Initially, the handset of telephone set 12 is lifted off hook to supply power to the telephone accessory communications device 10. No additional power supply is required. CPU 20 is reset and ready for the output of the service selector key circuit 24.

The user initiates the transaction by depressing the service selector key 11 that corresponds to the desired service. A service select signal is output on lead 26 that is generated by the depression of and corresponds to service selector key 11. CPU 20, under program control from code stored in EEPROM 28, retrieves the telephone number corresponding to the depressed service selector key 11 stored in EEPROM 28. CPU 20 then provides the corresponding retrieved stored information as a control signal to the telephone signalling generator 34 to produce a DTMF signal representing the telephone number to be dialed for the desired service.

To illustrate, CPU 20 retrieves the exemplary telephone number 09 0A 00 01 08 00 00 04 03 05 01 02 03 04 0A 04 (all in hexadecimal). CPU 20 passes the first digit 09 to the telephone signalling generator 34 via serial lead 36. In response, the telephone signalling generator generates a DTMF tone that corresponds to the digit 09, which subsequently is output to the hotel PBX.

CPU 20 then decodes the sequence 0A, 00 and accordingly delays the serial output of the digits 01 08 00 00 04 03 05 01 02 03 04 to the telephone signalling generator 34 for a period of about 1 second. Thereafter, the telephone signalling generator 34 outputs DTMF signals onto lead 40 that correspond to the delayed digits.

CPU then decodes the sequence 0A, 04 as a delay of about 9 seconds. This delay may be required so that the control system for the selected service may connect to the device 10. Once connected, CPU 20 retrieves the serial or identification number from the EEPROM 28 and outputs it as another control signal. The telephone signalling generator 34 receives the other control signal from CPU 20 and transmits a corresponding DTMF signal sequence that is illustrated in Table 2.

TABLE 2

Serial Number Transmission Sequence

| Position | DTMF Character | Description |
|---|---|---|
| 1 | "B" | Start Sentinel |
| 2 | "0"–"9" | S/N digit 1 |
| 3 | "0"–"9" | S/N digit 2 |
| 4 | "0"–"9" | S/N digit 3 |
| 5 | "0"–"9" | S/N digit 4 |
| 6 | "0"–"9" | S/N digit 5 |
| 7 | "0"–"9" | S/N digit 6 |
| 8 | "#" | End Sentinel |
| 9 | "0"–"#" | LRC |

The serial number is transmitted with a DTMF "B" character at the beginning to prevent false serial numbers from being given from the telephone keypad 13, since DTMF "B" cannot be generated by the keypad 13. The LRC in Table 2 is a longitudinal redundancy check digit, and is an exclusive-or function of the hexadecimal equivalents of the DTMF characters in positions 1–8.

Following this transmission, the user is prompted to pass a credit card through the card slot 15. Preferably, the control system of the desired service provides an audio or visual prompt to the user.

CPU 20, under program control, preferably converts the information stored on the credit card regardless of the direction of passing the credit card through card slot 15.

Thereafter, the information stored on the credit card, either numeric or alphanumeric, is converted by CPU 20 under program control into yet another control signal output to the telephone signalling generator 34. The telephone signalling generator 34 converts this control signal into a DTMF signal sequence that corresponds to the information stored on the credit card as illustrated in Table 3.

TABLE 3

Credit Card Number Transmission Sequence

| Position | DTMF Character | Description |
| --- | --- | --- |
| 1 | "B" | Start Sentinel |
| 2 to X | "0"–"9" | Account Number |
| X + 1 | "D" | Field Separator |
| X + 1 to N | "0"–"9" | Additional Data |
| N + 1 | "#" | End Sentinel |
| N + 2 | "0"–"9" | LRC |

The account number is usually 16 digits, but may be a maximum of 19 digits. Thus, 2 to X equals the number of account number digits in Table 3. The additional data preferably includes the expiration data (usually four digits), and may also include a restriction or type (usually three digits), offset or PVV discretionary data (usually five digits) and other discretionary data of variable length. Accordingly, X+1 to N in Table 3 equals the number of additional data digits or characters.

If the number of positions from the start sentinel to the LRC is less than 40, the device 10 will transmit additional end sentinels ("#") to fill the remaining positions.

If the credit card is read successfully, a preferred one second pause lapses and the device 10 retransmits its serial number as a further control signal as described above. If the credit card number could not be read successfully, the device 10 will transmit its serial number as described before, followed by the sequence shown in Table 4.

TABLE 4

Credit Card Number Read Error

| Position | DTMF Character | Description |
| --- | --- | --- |
| 1 | "B" | Start Sentinel |
| 2 | "D" | Field Separator |
| 3 | "1" | Code for Read Error |
| 4 | "#" | End Sentinel |
| 5 | "0"–"9" | LRC |

It is preferred that the service control system utilizes a time-out in case there is a read error, and also reprompts the user to swipe the credit card again. Additionally, the device 10 will preferably retransmit the serial number whenever the service selector key is depressed while the device 10 is connected to the service control system. Also, the device 10 will retransmit the credit card number each time the card is swiped through the device 10 while connected to the service control system.

It is also preferred that, prior to the service selector key 11 being depressed, only information from a magnetic programming card when passed through the card slot 15 is accepted by CPU 20. CPU 20 ignores any information from the card reader 18 prior to the service select key 11 being depressed that is not provided by a magnetic programming card. Thus, an ordinary credit card passed through card slot 15 prior to the service selector key 11 being depressed will not cause a DTMF signal to be generated.

Also, while DTMF signals are being transmitted in response to either the depression of the service selector key 11 or passing a credit card through card slot 18, subsequent depression of service selector key 11 or passing a credit or magnetic programming card through the card slot 15 will neither interrupt the DTMF signal transmission nor cause subsequent DTMF signal transmission. This is accomplished by CPU 20 ignoring the subsequent service select and information signals.

To illustrate the features of the present invention, the telephone accessory communications device connected electrically in series with a standard telephone set to a hotel PBX will be described. An external apparatus, such as a service control system including a computer, is connected to the PBX to receive information from the telephone accessory communications device. The computer controls audio/video and other equipment to provide selected audio/video signals to a room via the hotel cable system.

To further illustrate the advantages of the present telephone accessory communications device, a user in a room lifts the handset of the telephone set so that the telephone accessory communications device receives power. The user then depresses a service selector key for a desired service, such as a movie, which causes the telephone accessory communications device to initially output to the PBX a DTMF signal corresponding to the number that will connect the telephone accessory communications device to the service control system. The telephone accessory communications device delays outputting other information until the connection is made to the service control system.

Once the connection is made, the telephone accessory communications device provides the service control system with information such as a serial number or similar identification number. In response, the service control system enables equipment responsive thereto to supply a menu to the television set in the user's room over the hotel cable system. The user then makes selections from the menu using the keypad on the telephone set in the room.

After the selection is made, the user is prompted to pass a credit card through the slot of the telephone accessory communications device to accept the selection. The credit card information is provided by a DTMF signal to the service control system for storage and subsequent retrieval by the vendor. The service control system then activates the audio/video equipment and other equipment to provide the selection over the cable system to the television set in the user's room.

Components such as the card reader, selector buttons, selector buttons circuit, EEPROM, computer cable connector, CPU, telephone signalling generator and telephone line connector, are known in the art, and thus are not described in detail herein, and form no part of the present invention. Numerous variations and modifications of the embodiments described above may be effected without departing from the spirit and scope of the novel features of the invention. It is to be understood that no limitations with respect to the specific device illustrated herein are intended or should be inferred. It is, of course, intended to cover by the appended claims all such modifications as fall within the scope of the claims.

We claim:

1. A telephone accessory communications device externally coupled to a response device and an external apparatus comprising:
   (a) an actuator device providing a service select signal corresponding to a selected service;
   (b) an information retrieving device providing an information signal corresponding to data stored by an information storage device;
   (c) a cable connector for providing reception of programming data from an external device;
   (d) central processing unit coupled to retrieve the information signal, the service select signal and the programming data, and generating in response thereto respective control signals that each correspond to one of the service select signal and the information signal, and enabling the storage of the programming data; said central processing unit being enabled to generate said control signals by activating said response device; and
   (e) a telephone signalling generator coupled to retrieve the generated control signals and in response thereto emitting to said external apparatus analog signals that enable said selected service; said telephone signalling generator permitting said response device to transmit signals to said external apparatus when said central processor is enabled.

2. The device in accordance with claim 1 wherein the telephone signalling generator emits DTMF signals as the analog signals.

3. The device in accordance with claim 1 wherein the central processing unit further generates and provides another control signal corresponding to a stored serial number associated to the telephone accessory communication device, and the telephone signalling generator emits another analog signal in response to the other control signal.

4. The device in accordance with claim 3 wherein the telephone signalling generator transmits a signal corresponding to the serial number each time the actuator device is actuated.

5. The device in accordance with claim 1 wherein the telephone signalling generator transmits a signal corresponding to the information signal each time the information storage device is passed through the information retrieving device.

6. The device in accordance with claim 1 wherein said analog signals are emitted to a telephone line.

7. The device in accordance with claim 6 being connected in series with said response device to the telephone line.

8. The device in accordance with claim 7 wherein the response device is a standard telephone set including a keypad.

9. The device in accordance with claim 8 wherein DTMF signals generated by the standard telephone set pass through the telephone accessory communication device to the telephone line.

10. The device in accordance with claim 7 further being coupled to an external power supply.

11. The device in accordance with claim 10 wherein the external power supply is a standard telephone line that provides power to the device when the response device is activated.

12. The device in accordance with claim 1 further comprising a memory device coupled to provide output memory signals to the central processing unit and to store the programming data.

13. The device in accordance with claim 12 wherein the memory device is an EEPROM.

14. The device in accordance with claim 12 wherein the memory device is integrated with the central processing unit.

15. The device in accordance with claim 1 wherein the telephone accessory communications device communicates uni-directionally with the external apparatus.

16. The device in accordance with claim 1 wherein the information retrieving device is a magnetic card reader.

17. The device in accordance with claim 1 wherein said cable connector is engageable with a cable that is linkable with a computer to provide the programming data to the central processing unit and said information retrieving device comprising a magnetic card reader that provides for reception of said programming data.

18. The device in accordance with claim 17 wherein the cable connector is electrically connected to the central processing unit partially in parallel with the information retrieving device, wherein the central processing device receives programming data from the information retrieving device or from the computer through the cable connector.

19. The device in accordance with claim 1 wherein the central processing unit is capable of receiving programming data after installation of the telephone accessory communications device.

20. A telephone accessory communications device for connecting to a response device and a standard telephone line comprising:
   (a) at least one service selector key that initiates a service select signal;
   (b) a magnetic card reader providing an information signal responsive to data encoded on a magnetic strip of a card;
   (c) a cable connector providing for reception of programming data;
   (d) a microprocessor operably coupled to each service selector key, to the magnetic card reader and the cable connector to receive the information and service select signals and the programming data, the microprocessor generating a control signal in response to the received information signal; said central processing unit enabled by said response device;
   (e) a memory device being programmed in response to the programming data and providing to the microprocessor an output memory signal corresponding to memory data stored therein in response to the service select signal received by the microprocessor when the at least one service selector key is actuated, the microprocessor generating at least another control signal corresponding to the output memory signal; and
   (f) a telephone signalling generator coupled to receive the control signals to generate and provide DTMF signals on said standard telephone line corresponding to the data encoded on the magnetic strip of the card and the memory data stored in the memory device; said telephone signalling generator permitting said response device to transmit signals to said standard telephone line when said central processor is enabled.

21. A telephone accessory communications device responsive to a response device comprising:
   (a) an actuator device providing a service select signal corresponding to a selected service;
   (b) an information retrieving device providing an information signal corresponding to data stored by an information storage device;
   (c) a central processing unit enabled by said response device and coupled to receive the information signal, the service select and programming data, the central processing unit generating a first control signal corresponding to the service select signal, a second control signal corresponding to a stored serial number associated to the telephone accessory communication device and a third control signal corresponding to the information signal, and enabling the storage of the programming data; and (d) a telephone signalling generator coupled to receive the first, second and third control signals to generate and provide corresponding first, second and third DTMF signals to said external apparatus; said telephone signalling generator permitting said response device to transmit signals to said external apparatus while said central processor is enabled, wherein the telephone signalling generator provides the third DTMF signal after the first DTMF signal corresponding to the first control signal is provided.

22. The device in accordance with claim 21 wherein the telephone signalling generator provides the third DTMF signal after the second DTMF signal is provided.

23. A programmable telephone accessory communications device operatively connected to a response device comprising:

(a) a service selector key circuit providing a service select signal;

(b) a magnetic card reader providing an information signal in response to information encoded on a magnetic strip of a card;

(c) a cable connector providing for the reception of programming data that includes an identification or telephone number;

(d) a central processing unit coupled to the service selector key circuit to receive the service select signal, to the magnetic card reader to receive the information signal and to the cable connector to receive the programming data, the central processing unit generating respective input memory control and address signals in response to the service select signal and the programming data, generating a control signal in response to the information signal, and providing the identification or telephone number; said central processing unit enabled by said response device;

(e) a memory device providing at least one output memory signal in response to the input memory control and address signals corresponding to the service select signal, storing the identification or telephone number in response to the input memory address and control signals corresponding to the programming data, wherein the central processing unit generates at least another control signal in response to the output memory signals; and (f) a telephone signalling generator coupled to receive the control signals to generate and provide DTMF signals on a standard telephone line in response to the control signals; said telephone signalling generator permitting said response device to transmit signals onto said standard telephone line while said central processor is enabled.

24. The device in accordance with claim 23 wherein the magnetic card reader and the cable connector are electrically coupled in parallel to the central processing unit.

25. The device in accordance with claim 23 wherein the information signal includes an identification or telephone number, the central processing unit receives and responsively generates other input memory control and address signals, and the memory device stores the telephone or serial number in response to the other input memory and address control signals.

* * * * *